US010942119B2

(12) United States Patent
Wayne et al.

(10) Patent No.: US 10,942,119 B2
(45) Date of Patent: Mar. 9, 2021

(54) CHARACTERIZING ATMOSPHERIC TURBULENCE USING THE COVARIANCE AND TEMPORAL INTENSITY FLUCTUATIONS OF AN OPTICAL SOURCE

(71) Applicant: SPAWAR Systems Center Pacific, San Diego, CA (US)

(72) Inventors: David T. Wayne, San Diego, CA (US); Galen D. Cauble, San Diego, CA (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 447 days.

(21) Appl. No.: 15/917,111

(22) Filed: Mar. 9, 2018

(65) Prior Publication Data

US 2019/0277758 A1 Sep. 12, 2019

(51) Int. Cl.
*G01N 21/41* (2006.01)
*G01W 1/00* (2006.01)

(52) U.S. Cl.
CPC .............. *G01N 21/41* (2013.01); *G01W 1/00* (2013.01); *G01N 2021/4106* (2013.01); *G01N 2201/06113* (2013.01); *G01W 2001/003* (2013.01)

(58) Field of Classification Search
CPC ........... G01N 21/41; G01N 2021/4106; G01N 2201/06113; G01W 1/00; G01W 2001/003
See application file for complete search history.

(56) References Cited

U.S. PATENT DOCUMENTS

| 7,603,038 B1* | 10/2009 | Berman ............. H04B 10/1121 398/118 |
| 7,705,971 B2 | 4/2010 | Crowe |
| 7,982,862 B2 | 7/2011 | Hite et al. |
| 8,279,423 B2 | 10/2012 | Shapira |

(Continued)

OTHER PUBLICATIONS

Hill, "Theory of saturation of optical scintillation by strong turbulence: plane-wave variance and covariance and spherical-wave covariance", Feb. 1982. (Year: 1982).*

(Continued)

*Primary Examiner* — Regis J Betsch
*Assistant Examiner* — Jeremy A Delozier
(74) *Attorney, Agent, or Firm* — Naval Information Warfare Center Pacific; Kyle Eppele; J. Eric Anderson

(57) ABSTRACT

A system and method are provided for receiving light that has traveled from an optical source through an atmosphere along a distance. The system includes: a receiver lens system having an aperture and being arranged to receive the light from the optical source; a beam splitter; an imaging lens; an image processing component; a photodetector system; and a refractive index structure parameter component. The photodetector system outputs data associated with averaged scintillation data of the aperture. The image processing component generates a normalized covariance curve based on a first portion of the received light. The refractive index structure parameter component generates a refractive index structure parameter, $C_n^2$, of the atmosphere along the distance based on the data associated with averaged scintillation data of the aperture and the normalized covariance curve.

17 Claims, 7 Drawing Sheets

(56) References Cited

U.S. PATENT DOCUMENTS

| 8,325,327 | B2* | 12/2012 | Rogers | G01P 5/26 |
| | | | | 356/27 |
| 9,678,208 | B2 | 6/2017 | Volfson | |
| 2010/0253932 | A1* | 10/2010 | Shapira | G01S 17/95 |
| | | | | 356/28 |
| 2013/0314694 | A1* | 11/2013 | Tchoryk, Jr. | G01N 21/45 |
| | | | | 356/28.5 |

OTHER PUBLICATIONS

R. Frehlich "Estimation of the parameters of the atmospheric turbulence spectrum using measurements of the spatial intensity covariance".

Z. Azar, et.al "Aperture averaging of the two-wavelength intensity covariance function in atmospheric turbulence".

L. Andrews, R. Phillips, "Laser beam propagation through random media" pp. 140-141, 342-343, 410-411.

* cited by examiner

CHARACTERIZING ATMOSPHERIC TURBULENCE USING THE COVARIANCE AND TEMPORAL INTENSITY FLUCTUATIONS OF AN OPTICAL SOURCE

FEDERALLY-SPONSORED RESEARCH AND DEVELOPMENT

The United States Government has ownership rights in this invention. Licensing inquiries may be directed to Office of Research and Technical Applications, Space and Naval Warfare Systems Center, Pacific, Code 72120, San Diego, Calif., 92152; telephone (619) 553-5118; email: ssc_pac_t2@navy.mil.

BACKGROUND OF THE INVENTION

Embodiments of the invention relate to characterizing atmospheric turbulence by way of an optical system.

Communications systems often employ coherent light beams such as lasers to transmit information through the atmosphere. As the coherent beam propagates through the atmosphere, it may encounter atmospheric turbulence. This atmospheric turbulence, or refractive-index fluctuations, results in intensity fluctuations at the receiving end of the propagation path. Atmospheric turbulence causes signal dropouts and other distortions and is often the limiting factor in communications systems.

It is important to characterize the atmospheric turbulence in order to compensate for fluctuations in the signal. Many prior-art methods exist for characterizing the strength of atmospheric turbulence. These methods are based upon instruments that collect intensity data from optical sources, compute statistics on received light, and use well-known equations to derive characterizations of turbulence strength. A limitation of some prior-art methods is that they rely on certain assumptions about atmospheric turbulence conditions and propagation path length.

There exists a need for a system of accurately characterizing atmospheric turbulence along the path between an optical source and an optical receiver.

SUMMARY OF THE INVENTION

An aspect of the present invention is drawn to a system for receiving light that has traveled from an optical source through an atmosphere along a distance. The system includes: a receiver lens system having an aperture and being arranged to receive the light from the optical source; a beam splitter; an imaging lens; an image processing component; a photodetector system; and a refractive index structure parameter component. The photodetector system outputs data associated with averaged scintillation data of the aperture. The image processing component generates a normalized covariance curve based on a first portion of the received light. The refractive index structure parameter component generates a refractive index structure parameter, $C_n^2$, of the atmosphere along the distance based on the data associated with averaged scintillation data of the aperture and the normalized covariance curve.

BRIEF DESCRIPTION OF THE DRAWINGS

The accompanying drawings, which are incorporated in and form a part of the specification, illustrate example embodiments and, together with the description, serve to explain the principles of the invention. In the drawings.

DETAILED DESCRIPTION OF THE EMBODIMENTS

The present invention characterizes atmospheric turbulence using covariance and temporal intensity fluctuations of an optical beam propagating through an atmosphere. In this connection, a system and method are provided for receiving light that has traveled from an optical source through an atmosphere along a distance.

Aspects of the present invention are drawn to measuring the statistics of the atmosphere using a photodetector system and an imaging system to produce two data products that are then used to solve equations for the strength of turbulence.

A system for characterizing atmospheric turbulence using covariance and temporal intensity fluctuations of an optical beam propagating through an atmosphere in accordance with aspects of the present invention will now be discussed with reference to FIGS. 1-7.

Figure 1:
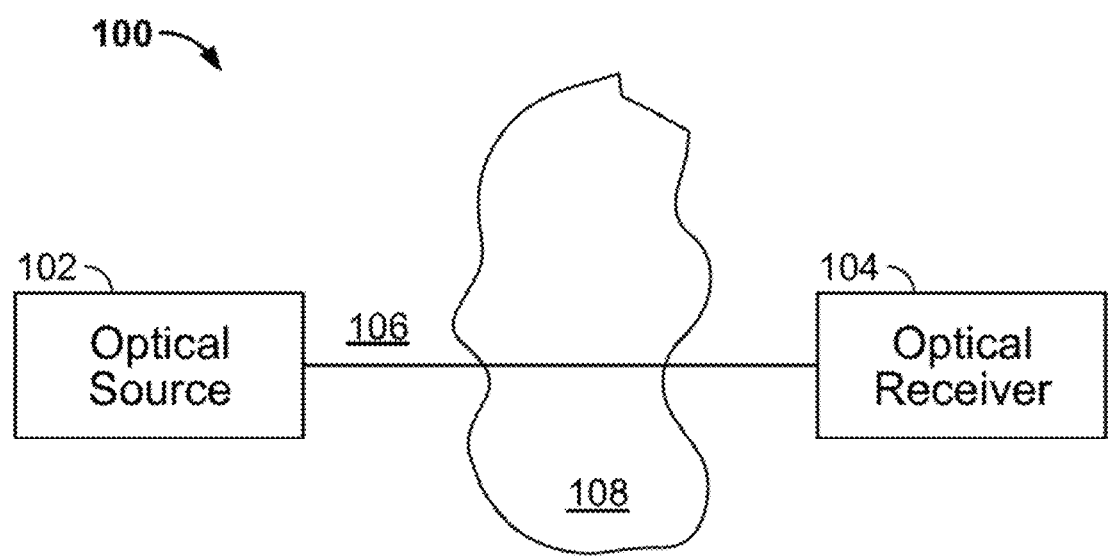
FIG. 1 illustrates an optical measurement system in accordance with aspects of the present invention.

FIG. 1 illustrates optical measurement system 100 in accordance with aspects of the present invention.

As shown in the figure, optical measurement system 100 contains an optical source 102, an optical receiver 104, a coherent beam 106, and atmosphere 108.

Optical source 102 transmits coherent beam 106 through atmosphere 108. Coherent beam 106 is received by optical receiver 104.

Optical source 102 may be any device or system that emits coherent beam 106. Non-limiting examples of optical source 102 include lasers, LEDs, or black-body radiators.

Coherent beam 106 is an electromagnetic signal with a fixed phase relationship between electric fields at different locations or times in the signal. A non-limiting example of coherent beam 106 is a laser beam.

Atmosphere 108 may be any body of gases through which coherent beam 106 propagates. A non-limiting example of atmosphere 108 is Earth's atmosphere.

Optical receiver 104 is a device or system that receives coherent beam 106 through atmosphere 108. Non-limiting examples of optical receiver 104 include devices that measure the qualities of coherent beam 106 or decode a data stream carried by coherent beam 106.

Optical receiver 104 receives coherent beam 106, which may be distorted by turbulence in atmosphere 108. Optical receiver 104 may measure the strength of the turbulence, and will now be discussed with reference to FIGS. 2-7.

Figure 2:
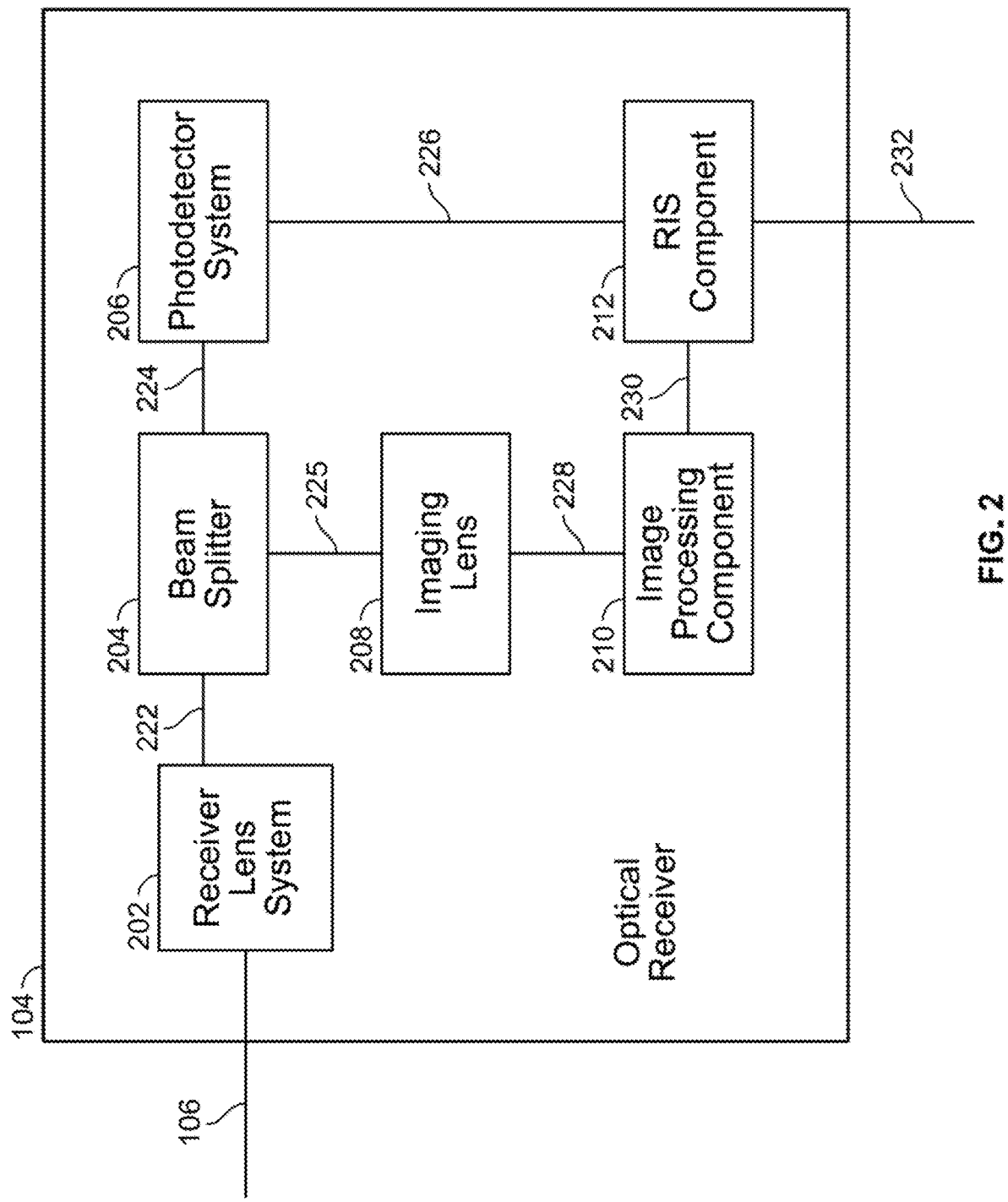
FIG. 2 illustrates an optical receiver in accordance with aspects of the present invention.

FIG. 2 illustrates optical receiver 104 in accordance with aspects of the present invention.

As shown in the figure, optical receiver 104 includes a receiver lens system 202, a beam splitter 204, a photodetector system 206, an imaging lens 208, an image processing component 210, and a refractive index structure component 212. The refractive index structure component 212 is referenced in FIG. 2 as RIS component 212.

In this example, photodetector system 206, image processing component 210, and refractive index structure component 212 are illustrated as individual devices. However, in some embodiments, at least two of photodetector system 206, image processing component 210, and refractive index structure component 212 may be combined as a unitary device. Further, in some embodiments, at least one of photodetector system 206, image processing component 210, and refractive index structure component 212 may be implemented as a computer having tangible computer-readable media for carrying or having computer-executable instructions or data structures stored thereon. Such tangible computer-readable media can be any available media that can be accessed by a general purpose or special purpose computer. Non-limiting examples of tangible computer-readable media include physical storage and/or memory media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. For information transferred or provided over a network or another communications connection (either hardwired, wireless, or a combination of hardwired or wireless) to a computer, the computer may properly view the connection as a computer-readable medium. Thus, any such connection may be properly termed a computer-readable medium. Combinations of the above should also be included within the scope of computer-readable media.

Receiver lens system 202 is arranged to receive coherent beam 106 and forms a beam 222. Beam splitter 204 is arranged to receive beam 222 and splits beam 222 into a beam 224 and a beam 225. Photodetector system 206 measures beam 224 and outputs a signal 226. Imaging lens 208 collects beam 225 and forms a beam 228, which is then processed by image processing component 210 to generate a signal 230. Signal 226 and signal 230 are used by refractive index structure component 212 to generate a signal 232.

Receiver lens system 202 may be any device or system that collects coherent beam 106 and forms beam 222. A non-limiting example of receiver lens system 202 is a telescope. Beam splitter 204 may be any device or system that splits beam 222 into two beams 224 and 225. Photodetector system 206 may be any device or system that takes beam 224 and outputs signal 226, whose values correspond to the aperture averaged scintillation index of beam 224. Imaging lens 208 may be any device or system that collects beam 225 and forms beam 228.

Image processing component 210 may be any device or system that receives beam 228 and outputs signal 230, whose values correspond to a normalized covariance curve of beam 228. In example embodiments, image processing component 210 includes a digital image receiver that is operable to receive beam 228 as an image of a two dimensional matrix of pixels. A non-limiting example of image processing component 210 is a charge coupled display (CCD) array and a central processing unit (CPU). Other example embodiments of image processing component 210 are a line detector array or a densely-packed array of photon counting detectors with known spacing, in combination with a digital signal processor (DSP) or a field programmable gate array (FPGA).

Refractive index structure component 212 may be any device or system that takes signals 226 and 230 and calculates signal 232, whose values represent a refractive index structure parameter $C_n^2$. A non-limiting example of refractive index structure component 212 is a CPU. Other example embodiments of refractive index structure component 212 include a DSP or FPGA.

FIG. 2 illustrates optical receiver 104 that characterizes turbulence in atmosphere 108. A method for characterizing such atmospheric turbulence will now be discussed with reference to FIG. 3.

Figure 3:
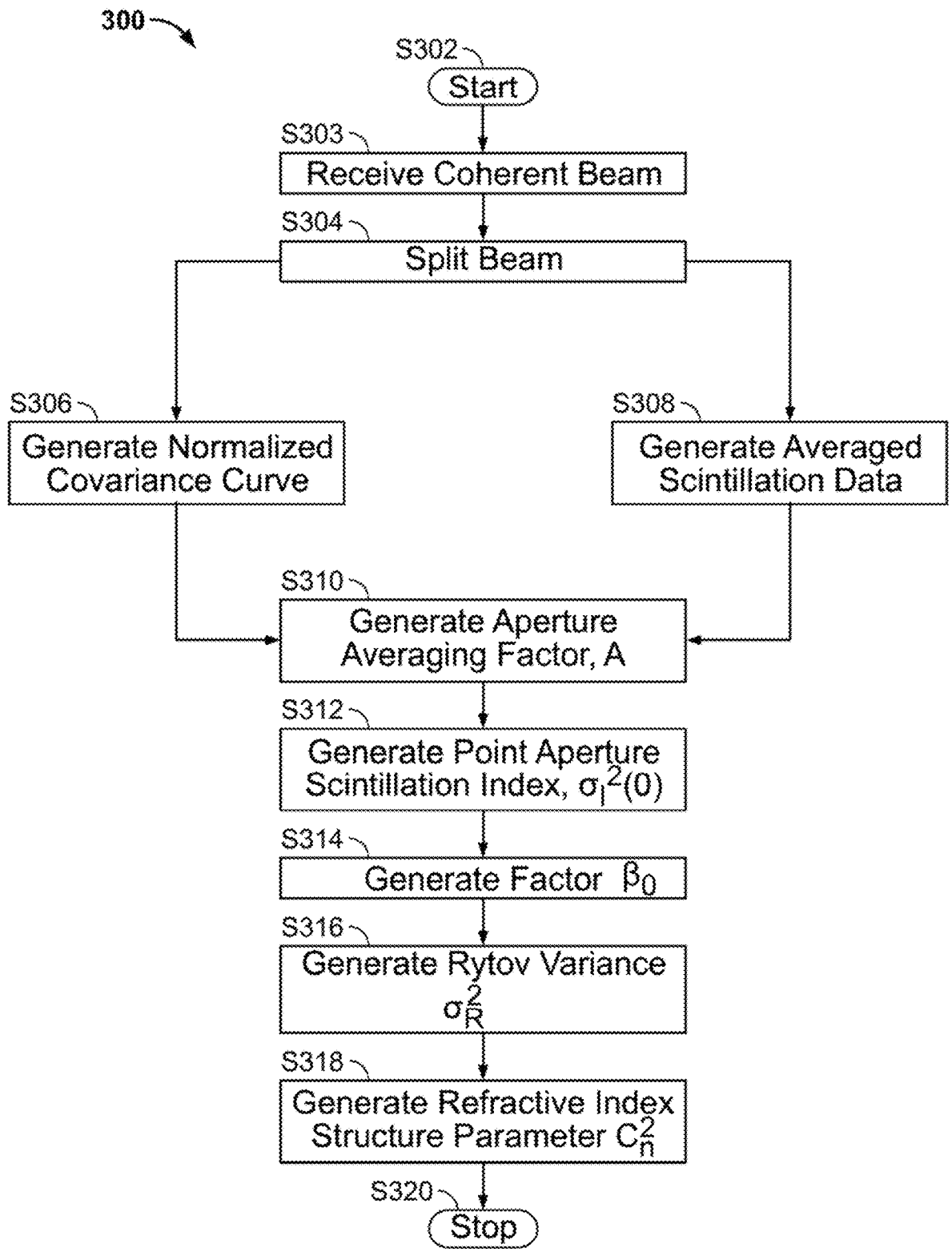
FIG. 3 illustrates a process for characterizing atmospheric turbulence in accordance with aspects of the present invention.

FIG. 3 illustrates a method 300 for characterizing atmospheric turbulence in accordance with aspects of the present invention.

Method 300 starts (S302). Referring to FIGS. 1-3 together, optical receiver 104 collects coherent beam 106 through receiver lens system 202 (S303). Beam splitter 204 splits beam 222 into beam 224 and beam 225 (S304).

Beam 225 is collected by imaging lens 208 and outputted as beam 228. Beam 228 is collected by image processing component 210 and is imaged onto a sensor array, an example of which will now be discussed with reference to FIGS. 4A-B.

Figure 4A:
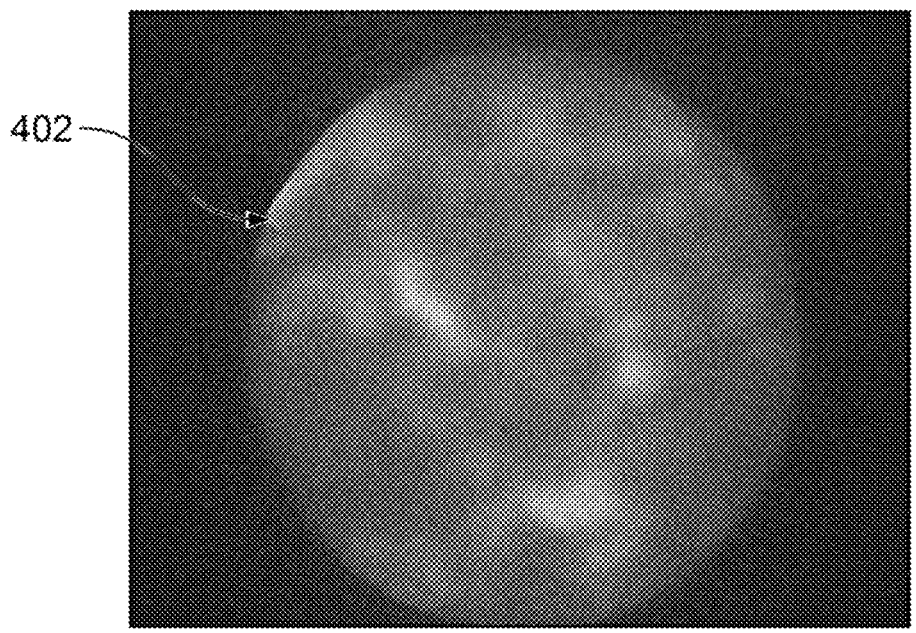
FIGS. 4A-B illustrate example optical beam irradiance patterns in accordance with aspects of the present invention.
Figure 4B:
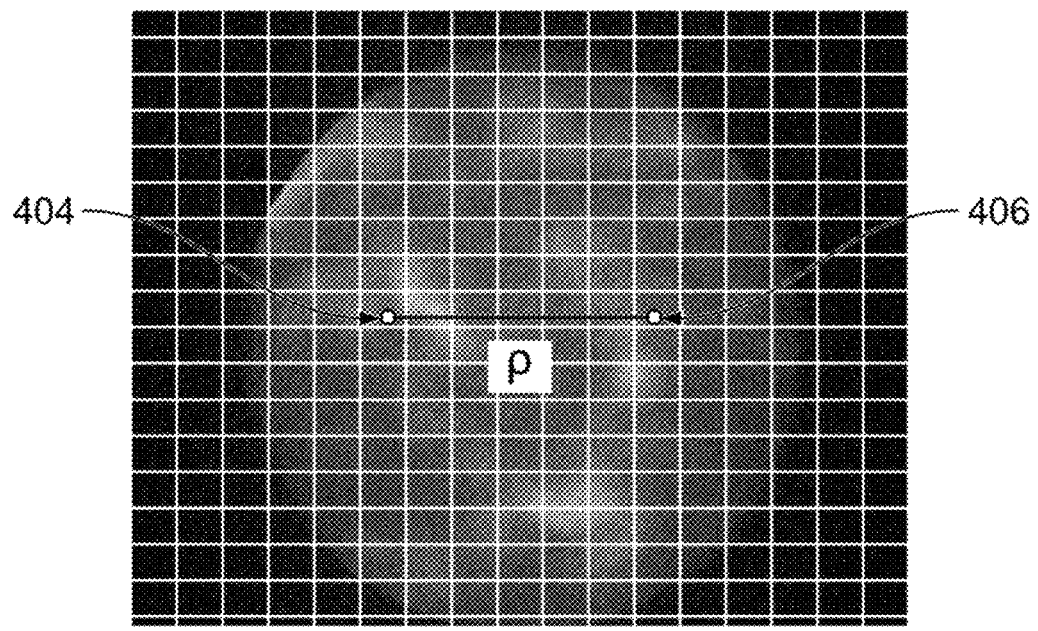

FIGS. 4A-B illustrate example optical beam irradiance patterns in accordance with aspects of the present invention.

As shown in the figures, FIG. 4A illustrates a laser beam irradiance pattern 402 as an image and FIG. 4B illustrates its projection as an image of two dimensional matrix of pixels onto an example camera array. As mentioned above with reference to FIG. 2, in example embodiments, image processing component 210 includes a digital image receiver that is operable to receive beam 228 as an image of a two dimensional matrix of pixels. Each square in FIG. 4B represents a camera pixel 404; each pixel 404 is a discrete sample of the intensity pattern, effectively dividing receiver lens system 202 into an array of sub-apertures. If the size of pixel 404 is smaller than the average size of a bright spot of laser beam irradiance pattern 402, then each pixel 404 can be approximated as a point detector.

Returning to FIG. 3, the digital counts of each pixel 404 are recorded and a normalized covariance curve, $b_I(p)$, is generated by image processing component 210 (S306) according to $$b_I(\rho) = \frac{\text{cov}(\rho_1, \rho_2)}{\sigma_{\rho_1}\sigma_{\rho_2}} = \frac{\langle(\rho_1 - \langle\rho_1\rangle)(\rho_2 - \langle\rho_2\rangle)\rangle}{\sigma_{\rho_1}\sigma_{\rho_2}} \qquad \text{Eq. 1}$$

wherein $p=|p_1-p_2|$ is the absolute distance between a first pixel 404 ($p_1$) and a second pixel 406 ($p_2$) in laser beam irradiance pattern 402, $\langle \ \rangle$ is the mean of the laser beam irradiance recorded by the first pixel or the second pixel, and $\sigma_{p1}$ and $\sigma_{p2}$ are the standard deviations of the laser beam irradiance recorded by the first pixel or the second pixel. Values of the normalized covariance curve are outputted by image processing component 210 as signal 230.

Beam 224 is collected by photodetector system 206 which calculates an aperture averaged scintillation index, $\sigma_I^2(D_G)$, (S308) according to $$\sigma_I^2(D_G) = \frac{\langle I^2 \rangle}{\langle I \rangle^2} - 1 \qquad \text{Eq. 2}$$

wherein I is the received intensity of the optical signal. Values of the aperture averaged scintillation index are outputted by photodetector system 206 as signal 226.

Refractive index structure component 212 uses signal 226 and signal 230 to generate an aperture averaging factor, A, (S310) according to $$A = \frac{\sigma_I^2(D_G)}{\sigma_I^2(0)} = \frac{16}{\pi}\int_0^1 xb_I(xD_G)\left(\cos^{-1}x - x\sqrt{1-x^2}\right)dx \quad \text{Eq. 3}$$

wherein $D_G$ is the diameter of the receiving optics lens.

Refractive index structure component 212 then generates a point aperture scintillation index, $\sigma_I^2(0)$, (S312) according to $$\sigma_I^2(0) = \frac{\sigma_I^2(D_G)}{A}. \quad \text{Eq. 4}$$

Refractive index structure component 212 then generates a factor, $\beta_0^2$, (S314) according to $$\sigma_{I,sp}^2(0) = \exp\left[\frac{0.49\beta_0^2}{\left(1 + 0.56\beta_0^{\frac{12}{5}}\right)^{\frac{7}{6}}} + \frac{0.51\beta_0^2}{\left(1 + 0.69\beta_0^{\frac{12}{5}}\right)^{\frac{5}{6}}}\right] - 1. \quad \text{Eq. 5}$$

Refractive index structure component 212 then generates a Rytov variance, $\sigma_R^2$, (S316) according to $$\sigma_R^2 = 2.5\beta_0^2 \quad \text{Eq. 6}$$

It should be noted that $\beta_0^2$ is the only calculated for a spherical wave, then it is converted via a scaling factor to Rytov variance, $\sigma_R^2$. One of skill in the art would understand that if the transmitted optical source is a plane wave, or any other shaped wave, as opposed to a spherical wave, then a slightly different equation would be used, but the algorithm would be the same.

Refractive index structure component 212 then generates a refractive index structure parameter, $C_n^2$, (S318) according to $$C_n^2 = \frac{\sigma_R^2}{1.23\ k^{7/16}L^{11/6}} \quad \text{Eq. 7}$$

wherein $k=2\pi/\lambda$ is the wave number of the received light, and L is the distance between optical source 102 and optical receiver 104 and outputs the values of $C_n^2$ as signal 232. Method 300 then stops (S320).

FIG. 3 illustrates method 300 for characterizing atmospheric turbulence and FIGS. 4A-B illustrate example laser beam irradiance patterns. Experimental results will now be discussed with reference to FIGS. 5-7.

Figure 5:
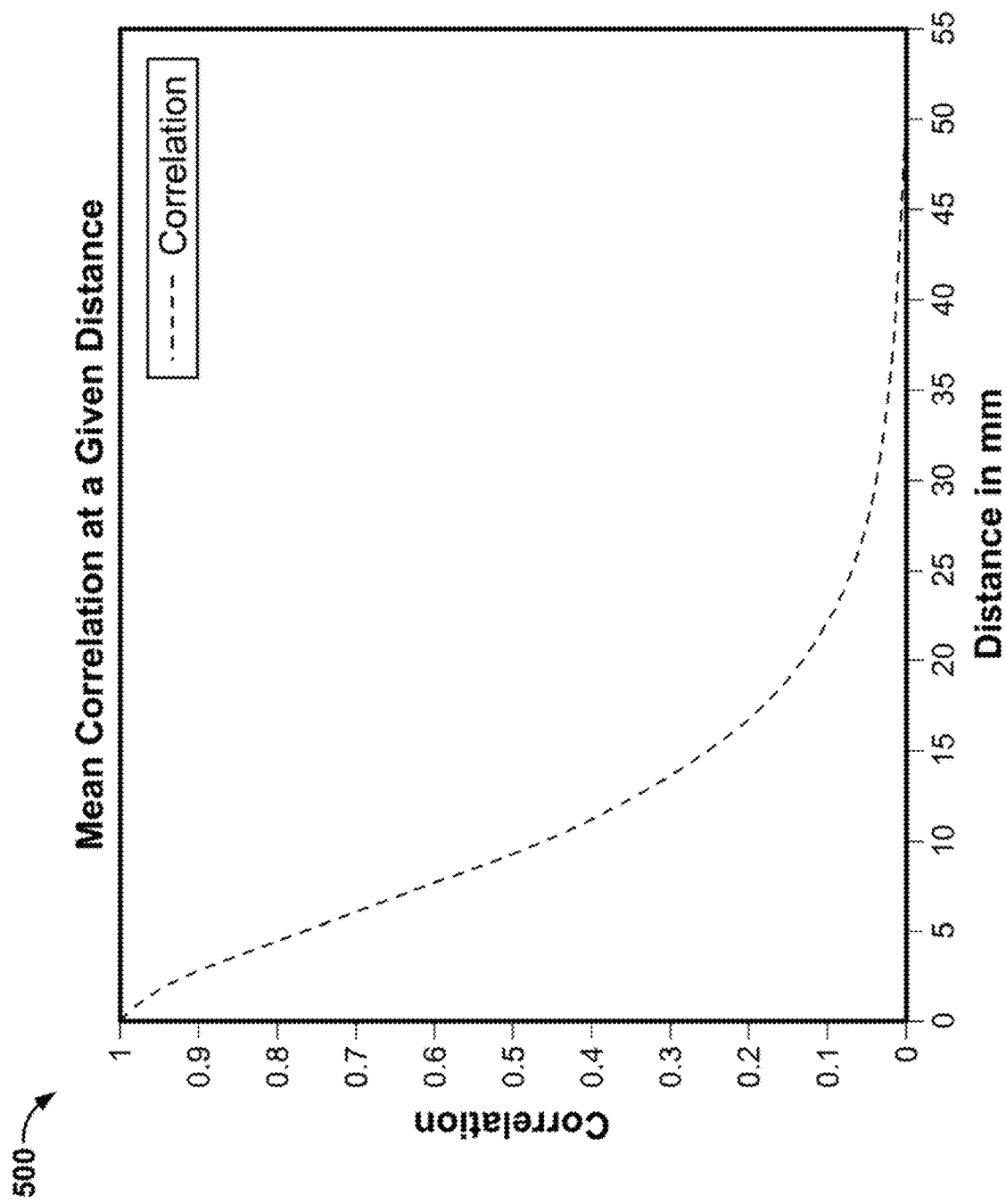
FIG. 5 illustrates an example distance correlation in accordance with aspects of the present invention.

FIG. 5 illustrates an example distance correlation in accordance with aspects of the present invention.

As shown in the figure, graph 500 describes an example mean correlation, or normalized covariance, between pixels at a given distance and represents the $b_I(xD_G)$ term from Eq. 3. The $b_I(xD_G)$ term is then used to calculate the full integrand, which will now be discussed with reference to FIG. 6.

Figure 6:
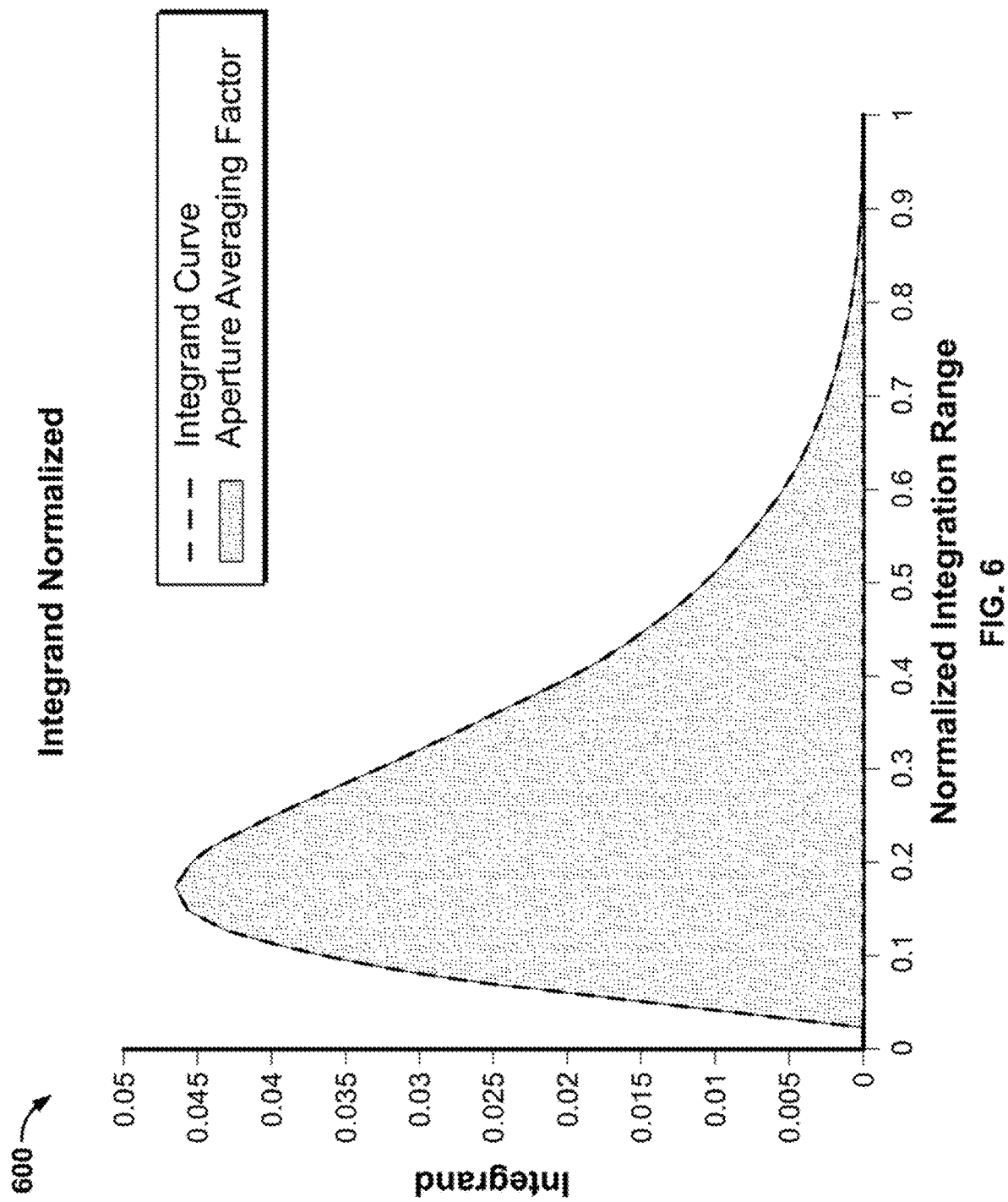
FIG. 6 illustrates an example normalized integrand in accordance with aspects of the present invention.

FIG. 6 illustrates an example normalized integrand in accordance with aspects of the present invention.

As shown in the figure, graph 600 describes an example integrand curve given by Eq. 3. The aperture averaging factor, A, is generated using numerical integration methods.

FIGS. 5-6 illustrate characterizations of coherent beam 106 generated by image processing component 210. Characterizations of coherent beam 106 generated by photodetector system 206 will now be discussed with reference to FIG. 7.

Figure 7:
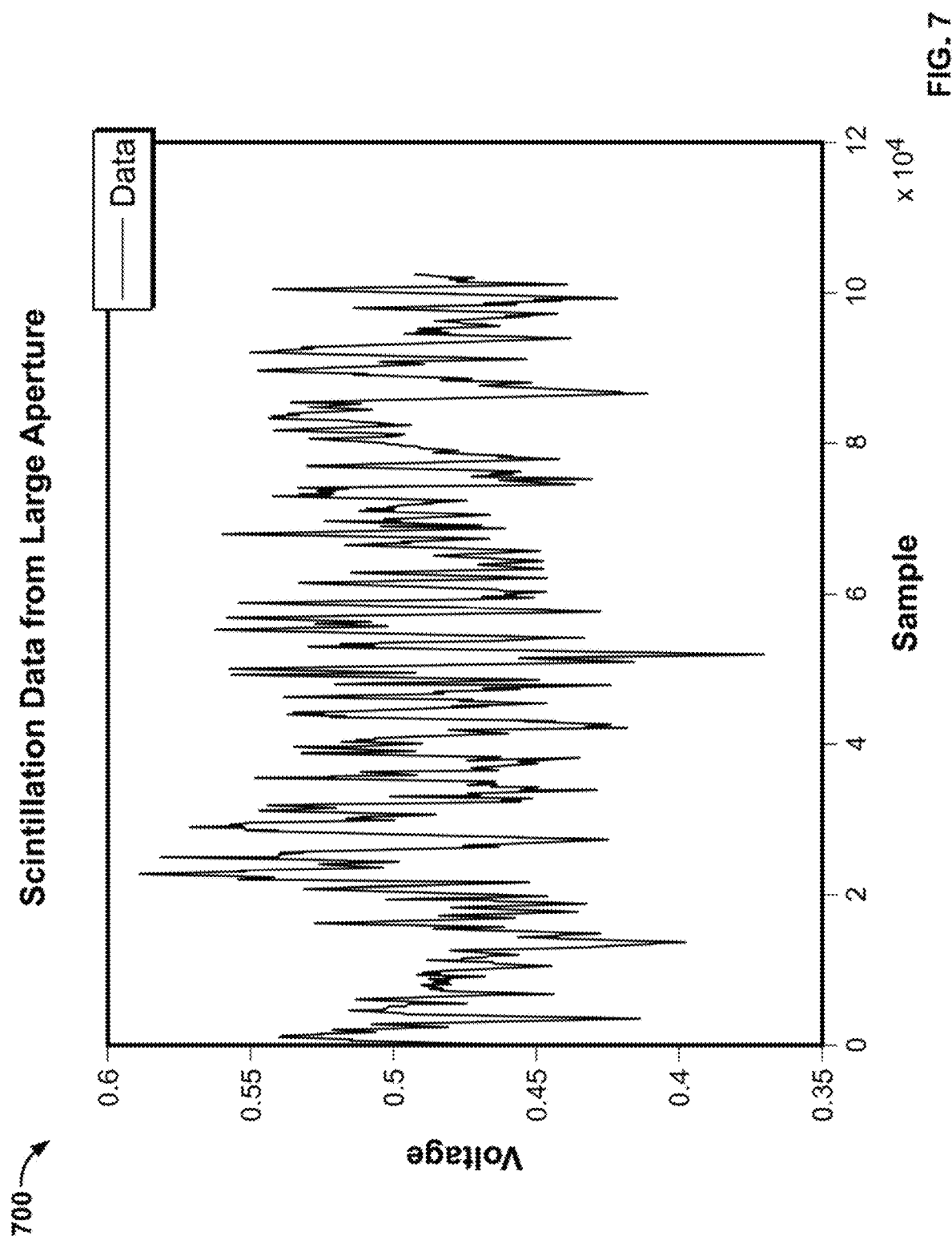
FIG. 7 illustrates example scintillation data in accordance with aspects of the present invention.

FIG. 7 illustrates example scintillation data in accordance with aspects of the present invention.

As shown in the figure, graph 700 illustrates example scintillation data collected by photodetector system 206. This data is used to calculate the aperture averaged scintillation index, $\sigma_I^2(D_G)$, given by Eq. 2.

In summary, atmospheric turbulence can degrade the quality of an optical signal, causing dropouts and other anomalies in an optical communication system. It is useful to be able to characterize atmospheric turbulence in order to compensate for such distortions.

Prior-art systems and methods to characterize atmospheric turbulence rely on collecting intensity data from an optical source, computing statistics on the received light, and using well-known equations to derive parameters that quantify the strength of atmospheric turbulence. One prior-art method measures the scintillation index of a laser beam that propagates through the atmosphere. The method works well for weak turbulence and a point aperture receiver, but is less accurate when turbulence increases or when using an optical receiver with a non-idealized aperture.

The invention presents a system for characterizing atmospheric turbulence using covariance and temporal intensity fluctuations of an optical beam propagating through an atmosphere. Prior-art methods rely on closed-form solutions that require assumptions about atmospheric turbulence conditions and propagation path length. The invention measures the covariance function of the spatial intensity directly, avoiding these assumptions and allowing the direct calculation of turbulence statistics. Measuring the covariance function directly reduces errors and creates a more robust system that can be used on dynamic measurement paths.

The foregoing description of various preferred embodiments have been presented for purposes of illustration and description. It is not intended to be exhaustive or to limit the invention to the precise forms disclosed, and obviously many modifications and variations are possible in light of the above teaching. The example embodiments, as described above, were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed as new and desired to be protected by Letters Patent of the United States is:

1. A system for receiving light that has traveled from an optical source through an atmosphere along a distance, said system comprising:
   a receiver lens system having an aperture and being arranged to receive the light from the optical source;
   a beam splitter;
   an imaging lens;
   an image processing component
   a photodetector system; and
   a refractive index structure parameter component, wherein said beam splitter is arranged to provide a first portion of the received light provided by said receiver lens system to said imaging lens and to provide a second portion of the received light provided by said receiver lens system to said photodetector system, wherein said photodetector system is operable to output data associated with averaged scintillation data of the aperture, wherein said image processing component is operable to generate a normalized covariance curve based on the first portion of the received light, wherein said refractive index structure parameter component is operable to generate a refractive index structure parameter, $C_n^2$, of the atmosphere along the distance based on the data associated with averaged scintillation data of the aperture and the normalized covariance curve, and wherein said photodetector system is operable to calculate an aperture averaged scintillation index, $\sigma_I^2$ (DG), of the received light according to $$\sigma_I^2(D_G) = \frac{\langle I^2 \rangle}{\langle I \rangle^2} - 1,$$

and wherein I is an intensity of the received light.

2. The system of claim 1, wherein said refractive index structure parameter component is operable to generate an aperture averaging factor, A, according to $$A = \frac{16}{\pi} \int_0^1 x b_I(x D_G) \left( \cos^{-1} x - x\sqrt{1-x^2} \right) dx.$$

3. The system of claim 2, wherein said refractive index structure parameter component is further operable to generate a point aperture scintillation index, $\sigma_I^2$ (0), according to $$\sigma_I^2(0) = \frac{\sigma_I^2(D_G)}{A}.$$

4. The system of claim 3,
wherein said refractive index structure parameter component is further operable to calculate a factor, $\beta_0$, according to $$\sigma_{I,sp}^2(0) = \exp\left[ \frac{0.49\beta_0^2}{\left(1 + 0.56\beta_0^{\frac{12}{5}}\right)^{\frac{7}{6}}} + \frac{0.51\beta_0^2}{\left(1 + 0.69\beta_0^{\frac{12}{5}}\right)^{\frac{5}{6}}} \right] - 1.$$

5. The system of claim 4, wherein said refractive index structure parameter component is further operable to calculate a Rytov variance, $\sigma_R^2$, according to $$\sigma_R^2 = \beta_0^2 2.5.$$

6. The system of claim 5, said refractive index structure parameter component is operable to generate the refractive index structure parameter, $C_n^2$, according to $$C_n^2 = \frac{\sigma_R^2}{1.23 \, k^{7/16} L^{11/6}}$$

wherein $k=2\pi/\lambda$ is the wave number of the received light, and wherein L is the distance between the optical source and the optical receiver.

7. A method for receiving light that has traveled from an optical source through an atmosphere along a distance, said method comprising:

receiving, via a receiver lens system having an aperture, the light from the optical source;

splitting, via a beam splitter, the received light from the optical source into a first portion of the received light and a second portion of the received light providing the first portion of the received light to an imaging lens;

providing the second portion of the received light to a photodetector system;

outputting, via the photodetector system, output data associated with averaged scintillation data of the aperture;

generating, via an image processing component, a normalized covariance curve based on the first portion of the received light generating, via a refractive index structure parameter component, a refractive index structure parameter, $C_n^2$, of the atmosphere along the distance based on the output data associated with averaged scintillation data of the aperture and the normalized covariance curve; and wherein said outputting, via the photodetector system, output data associated with averaged scintillation data of the aperture comprises calculating, via the photodetector system, an aperture averaged scintillation index, $\sigma_I^2$ (DG), of the received light according to $$\sigma_I^2(D_G) = \frac{\langle I^2 \rangle}{\langle I \rangle^2} - 1,$$

and wherein I is an intensity of the received light.

8. The method of claim 7, further comprising generating, via the refractive index structure parameter component, an aperture averaging factor, A, according to $$A = \frac{16}{\pi} \int_0^1 x b_I(x D_G) \left( \cos^{-1} x - x\sqrt{1-x^2} \right) dx.$$

9. The method of claim 8, further comprising generating, via the refractive index structure parameter component, a point aperture scintillation index, $\sigma_I^2$ (0), according to $$\sigma_I^2(0) = \frac{\sigma_I^2(D_G)}{A}.$$

10. The method of claim 9, further comprising:
calculating, via the refractive index structure parameter component, a factor, $\beta_0$, according to $$\sigma_{I,sp}^2(0) = \exp\left[\frac{0.49\beta_0^2}{\left(1+0.56\beta_0^{\frac{12}{5}}\right)^{\frac{7}{6}}} + \frac{0.51\beta_0^2}{\left(1+0.69\beta_0^{\frac{12}{5}}\right)^{\frac{5}{6}}}\right] - 1.$$

11. The method of claim 10, further comprising calculating, via the refractive index structure parameter component, a Rytov variance, $\sigma_R^2$, according to $$\sigma_R^2 = \beta_0^2 2.5.$$

12. The method of claim 11, further comprising generating, via the refractive index structure parameter component, the refractive index structure parameter, $C_n^2$, according to $$C_n^2 = \frac{\sigma_R^2}{1.23\ k^{7/16}L^{11/6}}$$

wherein $k=2\pi/\lambda$ is the wave number of the received light, and
wherein L is the distance between the optical source and the optical receiver.

13. A system comprising:
an optical source operable to emit light through an atmosphere;
a receiver lens system having an aperture and being arranged to receive the light from said optical source;
a beam splitter;
an imaging lens;
an image processing component
a photodetector system; and
a refractive index structure parameter component,
wherein said beam splitter is arranged to provide a first portion of the received light provided by said receiver lens system to said imaging lens and to provide a second portion of the received light provided by said receiver lens system to said photodetector system,
wherein said photodetector system is operable to output data associated with averaged scintillation data of the aperture,
wherein said image processing component is operable to generate a normalized covariance curve based on the first portion of the received light,
wherein said refractive index structure parameter component is operable to generate a refractive index structure parameter, $C_n^2$, of the atmosphere along the distance based on the data associated with averaged scintillation data of the aperture and the normalized covariance curve, and wherein said photodetector system is operable to calculate an aperture averaged scintillation index, $\sigma_I^2$ (DG), of the received light according to $$\sigma_I^2(D_G) = \frac{\langle I^2 \rangle}{\langle I \rangle^2} - 1,$$

and
wherein I is an intensity of the received light.

14. The system of claim 13, wherein said refractive index structure parameter component is operable to generate an aperture averaging factor, A, according to $$A = \frac{16}{\pi}\int_0^1 xb_I(xD_G)\left(\cos^{-1}x - x\sqrt{1-x^2}\right)dx.$$

15. The system of claim 14, wherein said refractive index structure parameter component is further operable to generate a point aperture scintillation index, $\sigma_I^2$ (0), according to $$\sigma_I^2(0) = \frac{\sigma_I^2(D_G)}{A}.$$

16. The system of claim 15,
wherein said refractive index structure parameter component is further operable to calculate a factor, $\beta_0$, according to $$\sigma_{I,sp}^2(0) = \exp\left[\frac{0.49\beta_0^2}{\left(1+0.56\beta_0^{\frac{12}{5}}\right)^{\frac{7}{6}}} + \frac{0.51\beta_0^2}{\left(1+0.69\beta_0^{\frac{12}{5}}\right)^{\frac{5}{6}}}\right] - 1.$$

17. The system of claim 16, wherein said refractive index structure parameter component is further operable to calculate a Rytov variance, $\sigma_R^2$, according to
$\sigma_R^2 = \beta_0^2 2.5.$

* * * * *